July 2, 1946.  L. H. KAUPKE ET AL  2,403,376
PLANTER
Filed Nov. 17, 1943  5 Sheets-Sheet 1

Inventors:
Lee H. Kaupke and
Lewis E. Smith,

By Paul O. Pippel.
Attorney.

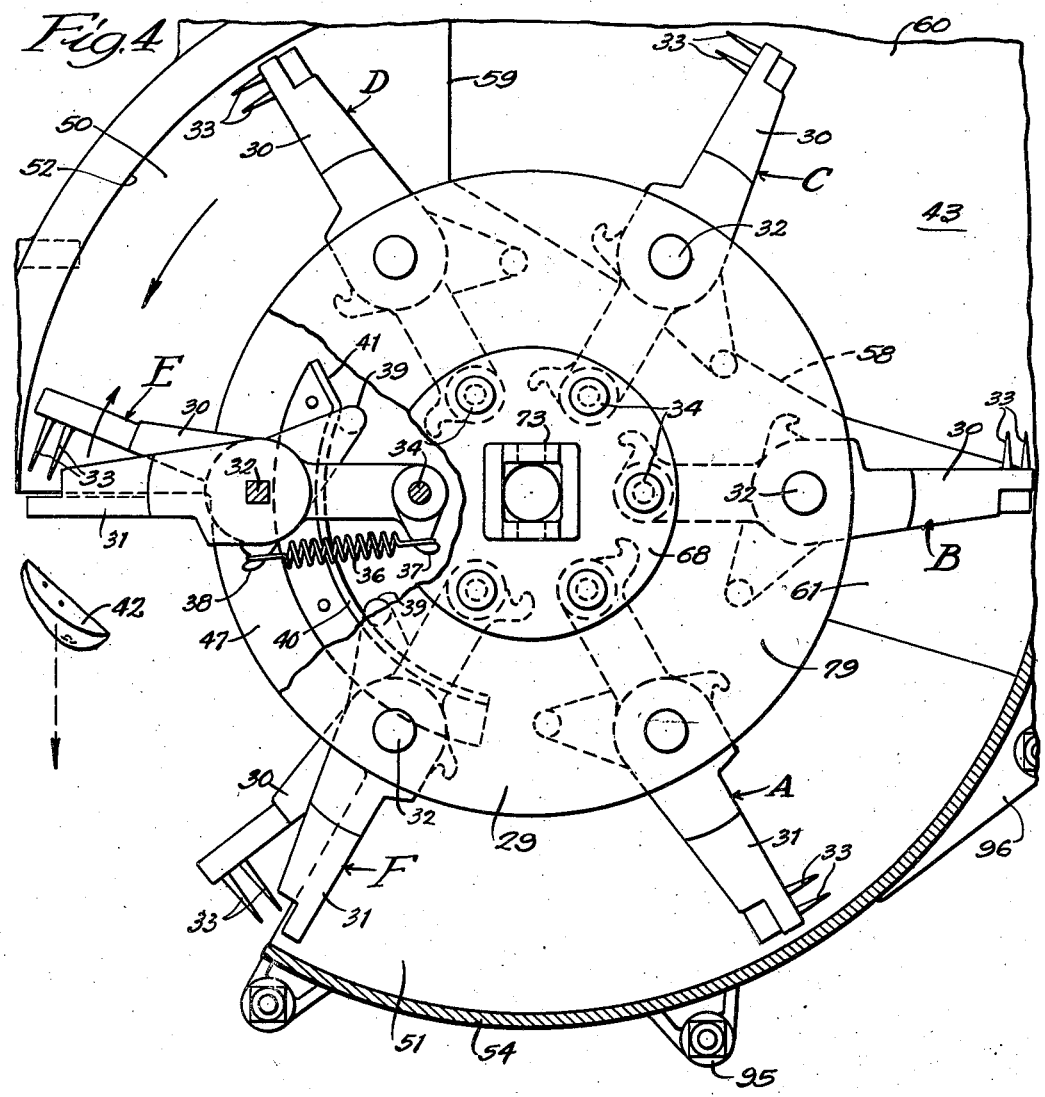

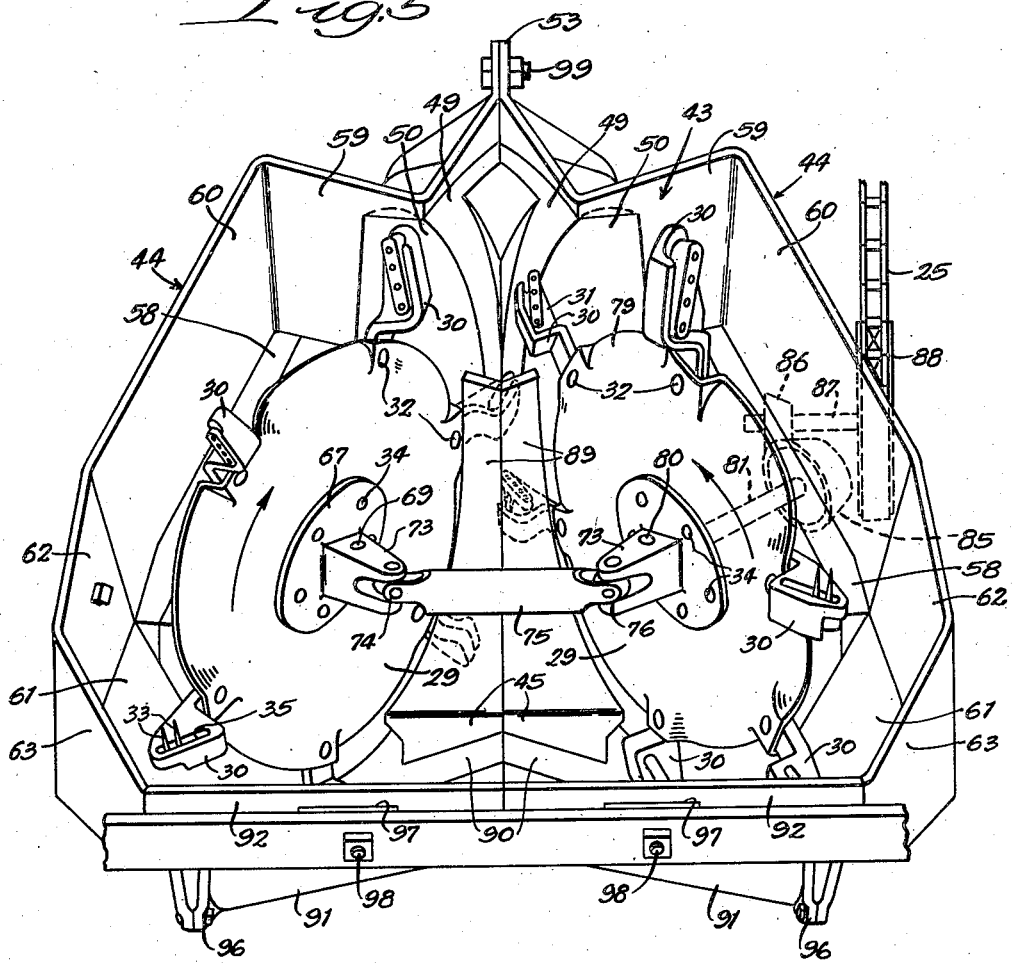

Patented July 2, 1946

2,403,376

UNITED STATES PATENT OFFICE 2,403,376

PLANTER

Lee H. Kaupke, La Grange, and Lewis E. Smith, Congress Park, Ill., assignors to International Harvester Company, a corporation of New Jersey Application November 17, 1943, Serial No. 510,576

5 Claims. (Cl. 222—13)

This invention relates to a planter. More specifically it relates to a planter of the pick type.

Planters are known that comprise rotatable members carrying picks upon which the seeds to be planted are impaled. These planters operate satisfactorily at low speeds, but the high speeds demanded nowadays require some change in the mode of operation. If the pick-carrying member is run faster, the picks may not take the seeds satisfactorily. If more picks are added to the pick-carrying member, the spacing between the picks may be so small that extra seeds are picked up that bridge across the picks. If two pick-carrying members are used side by side and the picks of one carrier are staggered from those of the other, the spacing between the picks is similarly reduced so that bridging occurs. The present application has to do with a planter of the pick-carrying type that is adapted for high-speed planting.

An object of the present invention is to provide an improved planter.

A further object is the provision of an improved planter of the pick type.

According to the present invention, seed-impaling members, such as picks, are mounted upon rotatable disks that are set at an angle to one another. Since the disks are at an angle to one another, they are closely spaced at one side of their axes of rotation and widely spaced at the other side of their axes of rotation. With this arrangement, seeds may be picked up by the picks at the widely spaced portions without a tendency toward bridging and may be discharged at the closely spaced portions.

In the drawings:

Figure 4 is a sectional view taken on the line 4—4 of Figure 3;

Figure 5 is a perspective view taken from the cross-point of a hopper and disks carrying picks constituting the novel feature of the present invention.

Figure 1:
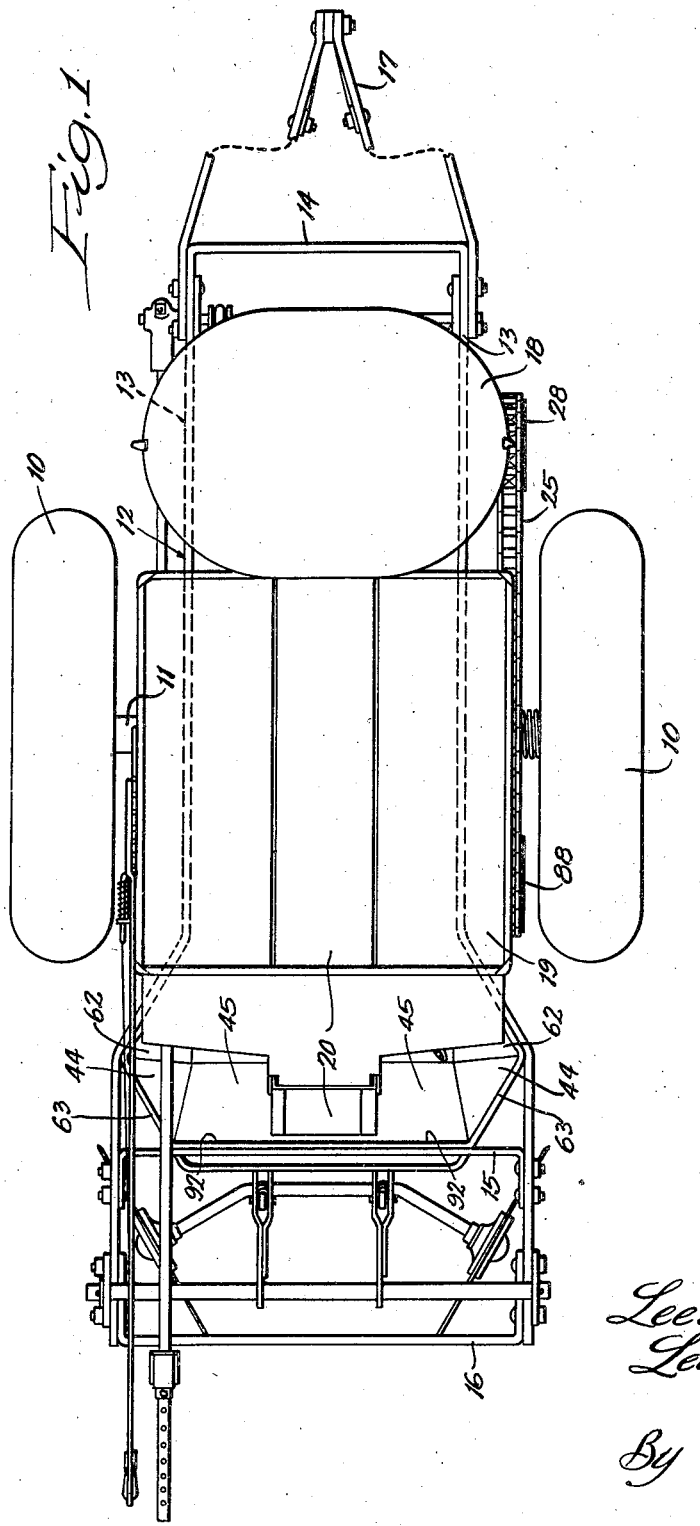
Figure 1 is a plan view of the improved planter of the present invention.
Figure 2:
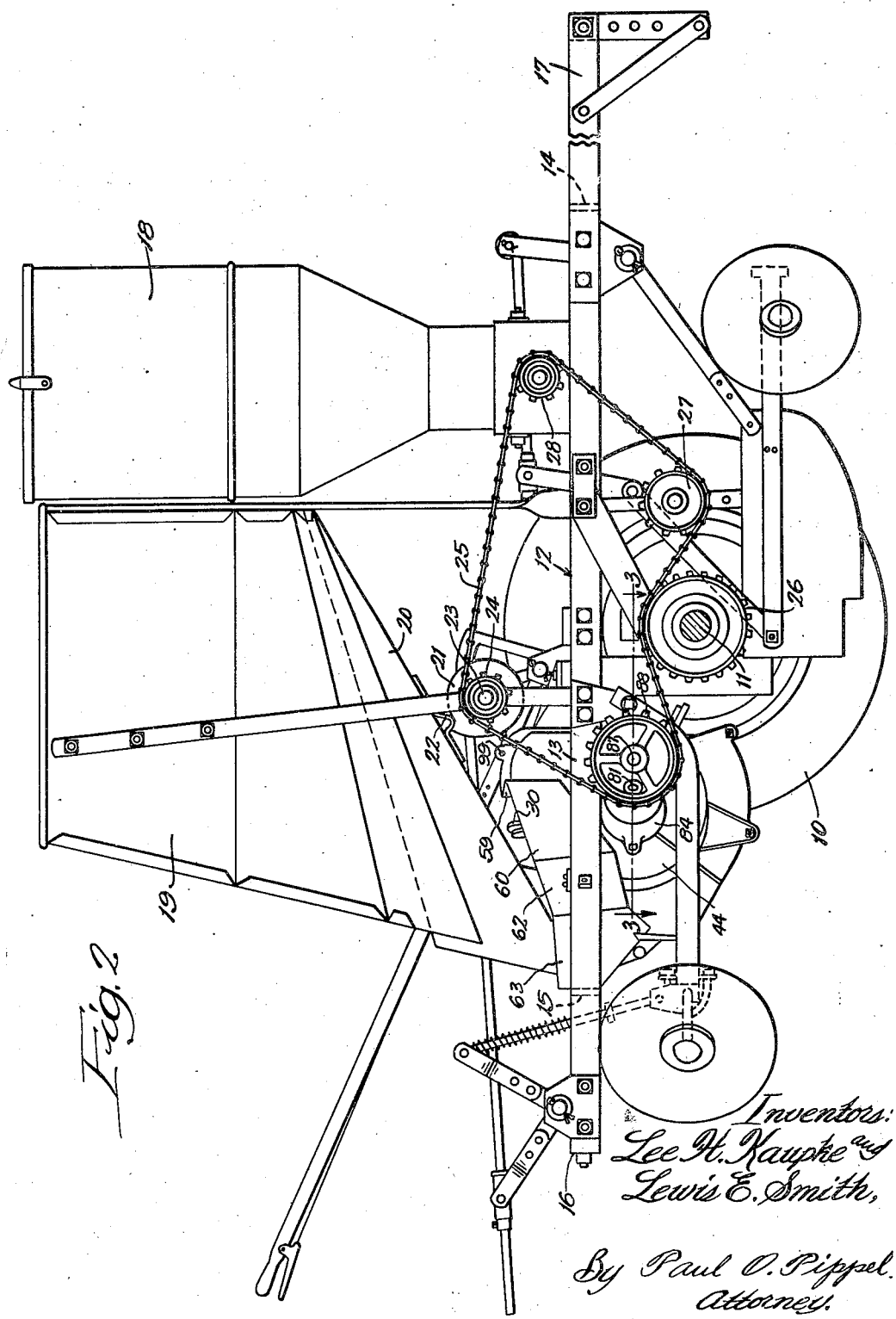
Figure 2 is a side view of the planter with parts removed.

The planter, as shown in Figures 1 and 2, includes a pair of supporting wheels 10, an axle 11, a framework 12, including longitudinal members 13, a front transverse member 14, and rear transverse members 15 and 16. The planter is adapted to be pulled through a hitch structure 17 by draft means, such as a tractor, not shown. The planter also includes a fertilizer box 18 from which fertilizer is dispensed through a mechanism, not shown, since it forms no part of the present invention. There is also provided a seed box 19. Positioned beneath the seed box 19 is a discharging member 20 which is oscillated vertically for aiding discharge of seed from the seed box 19 by means of a cam 21 acting against a part 22 secured against the base of the discharge member 20. The cam 21 is secured to a shaft 23 that drives the cam and in turn is driven by a sprocket 24 secured to the shaft. The sprocket 24 is driven by a chain 25 in turn driven by a sprocket 26 secured to the axle 11. The sprocket chain 25 engages an idler sprocket 27 and also a sprocket 28 serving to drive the fertilizer dispensing mechanism, previously stated not to be shown but associated with the fertilizer box 18.

Figure 3:
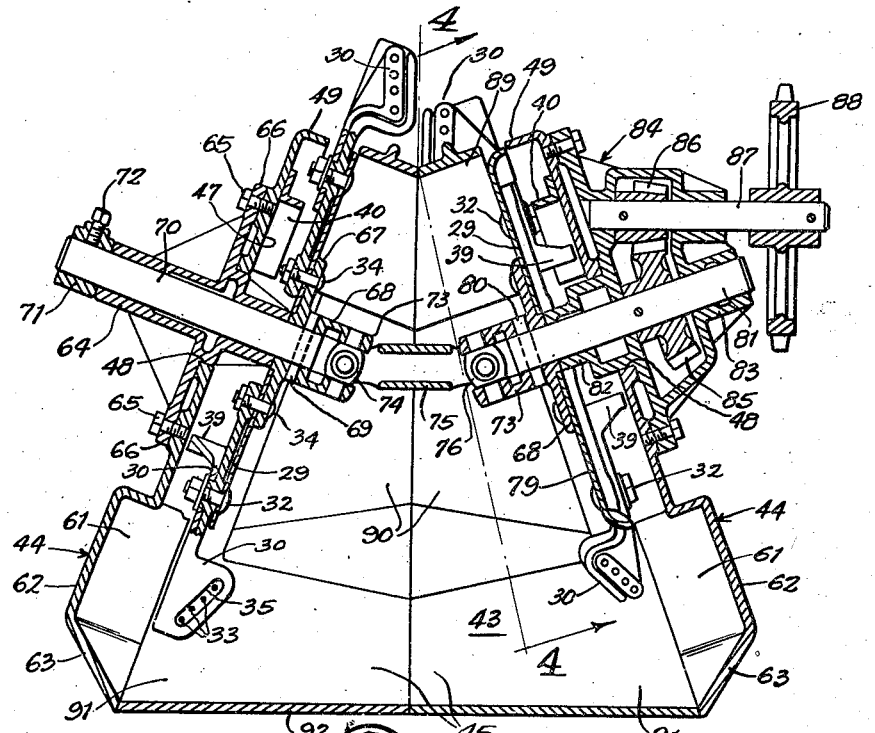
Figure 3 is a sectional view taken on the line 3—3 of Figure 2.

As seen in Figures 4 and 5, there is provided a pair of rotatable disks 29 arranged somewhat out of parallel so that their axes intersect at an obtuse angle. As shown in Figure 4, each disk 29 has mounted thereon a plurality of radially outwardly extending pick-carrying elements 30 spaced about the periphery of the disk 29. Each pick carrier 30 is pivotally mounted on a support 31 by a bolt 32. Each pick carrier 30 carries a plurality of picks 33 at its outer end. The bolt 32 and a bolt 34 secure each support 31 to a disk 29. Each support 31 has a slot 35 through which the picks 33 may extend. Each pick carrier 30 and support 31 are provided with a spring 36 connected by its ends to a projection 38 and a projection 37 on the pick carrier 30 and the support 31, respectively. The spring 36 acts to position the support 31 with respect to the pick carrier 30 so that the pick elements extend through the slots 35 in the support 31. Each pick carrier 30 has a follower portion 39 engageable with an arcuate cam 40. It will be seen in Figure 4 that four sets of pick carriers 30 and supports 31, arbitrarily designated as A, B, C, and D, are positioned so that their cam followers 39 do not contact the cam 40. For these sets the springs 36 act to maintain the pick carriers 30 and the pick-releasing member 40 in such position that the picks 33 extend through the slots 35. However, the sets of pick carriers 30 and supports 31, arbitrarily designated as E and F, have reached the cam 40, and the cam followers 39 are in contact with the cam 40. Thus, the pick carriers 30 are positioned with respect to the supports 31 so that the picks 33 are withdrawn from the slots 35 (Fig. 3). As the cam followers 39 reach the cam 40, they pass upon a sloping end portion 41 and cause the pick carriers 30 to be moved away from the supports 31, and the picks 33 are thereby withdrawn from the slots 35. As the cam followers 39 move off the lower end of the cam 40, the springs 36 cause the pick carriers 30 to return to the supports 31 and the picks 33 to be inserted into the slots 35. This change in position will be observed from a comparison of the sets A and F. Let it be assumed that the picks 33 of the set D carry a seed impaled upon them. When this set has reached the position of the set E, the pick carrier 30 will have moved sufficiently with respect to the support 31 as to cause withdrawal of the picks 33 from the slots 35 and consequently a release of the seed. This seed, represented by the character 42, is shown to be released and falling from the set E. As previously stated, each set of pick carriers 30 and supports 31 in passing from the position of the set F to the position of set A has its picks 33 projected into the slot 35. It is at this point that a seed is impaled upon the picks 33.

Figure 6:
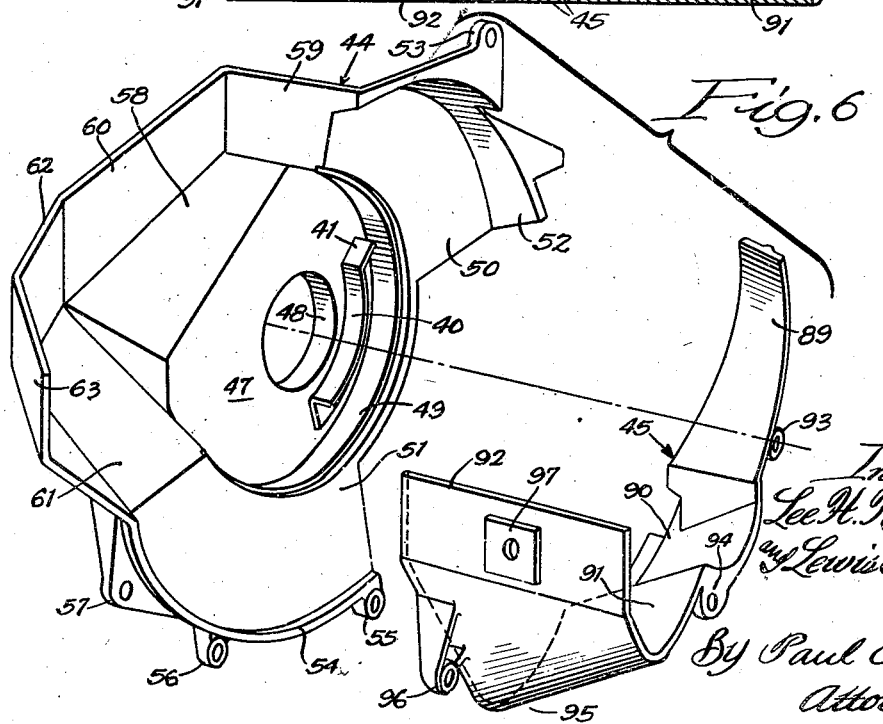
Figure 6 is an exploded view in perspective of a portion of the hopper.

The disks 29 with their pick carriers 30, picks 33, and supports 31 are positioned within a hopper 43, best shown in Figures 5 and 6. This hopper comprises a pair of side members 44 and a pair of central members 45. As seen in Figure 6, each side member 44 comprises a central portion 47, to which the cam 40 is attached, and which has an opening 48. Outward of the portion 47 is an arcuate flange 49. Outward of the flange 49 are a planar portion 50 and a planar portion 51. Outward of the planar portion 50 is an arcuate flange 52 which carries a boss 53. Outwardly of the planar portion 51 is an arcuate flange 54 at which are located bosses 55, 56, and 57. Extending laterally from the central portion 47 is a shelf 58 having a moderate incline downward toward the observer in Fig. 6 and being flanked by upstanding walls 59 and 60. Adjacent the shelf 58 is a steeply inclined portion 61. This is flanked by upstanding walls 62 and 63. Figure 6 shows the left-hand member 44. As seen in Figure 3, the left-hand member 44 has secured to it a bearing member 64 by means of bolts 65 extending through a flange portion 66 on the bearing member. The left-hand disk 29 is secured by the bolts 34 to a flange 67 of a member 68 secured by a pin 69 to a shaft 70 journaled in the bearing 64. A collar 71, secured to the shaft 70 by a set screw 72, holds the shaft 70 within the bearing member 64 and the disk 29 in the position shown in Figure 3. The member 68 has a portion 73 connected in a universal joint 74 with a link 75, connected in turn in a universal joint 76 with a portion 73 of the member 68 secured in similar fashion to a right-hand disk 79. A pin 80 joins the right-hand member 68 with a shaft 81 journaled in bearing portions 82 and 83 of a casting 84 secured to the right-hand end member 44. The casting 84 houses a bevel gear 85, secured to the shaft 81, and a bevel gear 86 meshing with the bevel gear 85 and secured to a shaft 87. A sprocket 88 is secured to the shaft 87 and meshes with the chain 25 (Fig. 2) driven through the sprocket 26 from the axle 11 and the ground wheels 10. Thus, drive is transmitted from the sprocket 88 through the shaft 87, the gears 85 and 86, and the shaft 81 to the right-hand disk 29. The link 75 and the universal joints 74 and 76 transmit drive from the shaft 81 to the left-hand disk 29. As seen in Figure 6, each central member 45 of the hopper 43 includes a narrow arcuate portion 89, a depressed portion 90, and a wide arcuate portion 91 having at one end an upstanding flange 92. The two central members are joined together by bolts not shown secured in bosses 93 formed on the narrow arcuate portion and bosses 94 formed at the junction of the depressed portions 90 and the wide arcuate portion 91. The wide arcuate portions 91 carry bosses 95 and 96 through which bolts not shown extend to secure the central members 45 to the end members 44, these bolts extending also through the bosses 56 and 57 on the end members 44. The flanges 92 on the central members 45 have thickened portions 97, through which bolts 98 extend to secure the central members 45 and the end members 44 to the transverse frame member 15 (Figure 1). A bolt 99 extending through bosses 53 on side members 44 secure the forward ends of these members to one another. With the plates 29 positioned within the assembled central members 45 and end members 44, the narrow arcuate portions 89 of the central members 45 are adjacent but spaced from the flange 49 between the planar portions 50 and 51. At this region, the sets of pick carriers 30 and supports 31 extend beneath the narrow arcuate portions 89 as indicated by the dotted line positions of these sets on Figure 5. The sets pass from beneath the arcuate portions 89 over the depressed portions 90 into the hopper 43 proper where they contact seeds, such as potatoes, and cause them to be impaled upon the picks 33. As previously described, the impaling is due to the fact that the return of the pick carrier 30 to the support 31, upon passing of the cam follower 39 off the lower end of the cam 40, causes the picks 33 to be projected through the slot 35. This motion of the picks 33 causes them to be driven into a potato seed. This occurs at about the time when a set composed of the pick carrier 30 and the support 31 passes from beneath the narrow arcuate portion 89 of the central member 45. As the disk 29 continues to rotate, the set rises and then moves rearwardly and downwardly along the planar portion 50 of the side member 44. It is at this point that the follower 39 strikes the cam 40 causing the picks 33 to be withdrawn from the slot 35 and the potato seed to be released. As will be seen from Figure 5, the upstanding walls 59, 60, 62, and 63 of the side member 44 and the inclined portions 58 and 61 are outward of the disk 29 so that any extra seeds carried upwardly and rearwardly by the disk 29 and falling outwardly of the disk do not fall to the ground but drop upon the inclined portion 58 and move downwardly therealong to the inclined portion 61 and downwardly and inwardly of the disk 29 to the depressed portion 90 of the central member 45 where they are positioned to be impaled upon the picks 33.

It will be observed from Figure 5 that at one side of the axes of rotation of the disks 29, the set comprising pick carriers 30 and supports 31 are adjacent one another so as to cause the seeds released from the picks 23 on one disk 29 to be at the same approximate point as the seeds released from the picks 33 on the other disk 29. At the other side of the axes of rotation of the disk 29 and in the region where the seeds are impaled upon the picks 23, the sets are well spaced from one another. This relationship is due to the fact that the axes of the disks 29 are not coincident but are at an obtuse angle with one another. Since the disks 29 are well spaced from one another at the regions at which the seeds are impaled upon the picks 23 and are carried upwardly and over to a discharge region, there is no tendency for bridging of seeds to occur because of the closeness of the seeds impaled upon the picks 33 of one disk 29 to the seeds impaled upon the picks 23 of the other disk 29. Since there is no bridging, only seeds impaled upon the picks 33 are carried to the discharge point. Thus, only the desired number of seeds is discharged.

From the foregoing description, it will be apparent that a new and novel planter construction has been devised. This construction has been illustrated as applied to a planter of the pick type which spears seeds, but it will be understood that it is applicable to other types of planters as well. The essential feature of the construction is that the disks or rotatable members, carrying means that pick up seeds, are arranged so that at the discharge point at one side of the axes of rotation, the carriers are closely spaced to cause discharge from the two carriers at approximately the same point, and at the other side of the axes the carriers are widely spaced so that there is no interference between the seeds picked up on one carrier and the seeds picked up on the other carrier such as to cause a bridging of the seeds and the delivery of too many seeds to the discharge point.

The intention is to limit the invention only within the scope of the appended claims.

What is claimed is:

1. A planter comprising a pair of rotatable carriers arranged with their axes of rotation out of parallelism and alinement so as to be relatively closely spaced with respect to one another but out of contact at portions at one side of the axes of rotation and relatively widely spaced from one another at portions at the other side of the axes of rotation, radially outwardly extending hinged means mounted on the carrier for causing seeds to be received at the widely spaced portions, means for causing seeds to be discharged from said means at the closely spaced portions, drive means axially disposed respectively relative to each carrier, and means drivingly interconnecting said drive means between the carriers to rotate the carriers together.

2. A planter comprising a pair of rotatable carriers arranged with their axes of rotation out of alinement and parallelism so as to be relatively closely spaced with respect to one another but out of contact at portions at one side of the axes of rotation and relatively widely spaced with respect to one another at the other side of the axes of rotation, a plurality of radially outwardly extending hinged seed-receiving means mounted on the periphery of the carriers so as to be generally equally spaced from one another and from the axes of rotation, means for releasing seeds from the seed-receiving means at the relatively closely spaced portions of the carriers, drive means axially disposed respectively relative to each carrier, and means drivingly interconnecting said drive means between the carriers to rotate the carriers together.

3. A planter comprising a hopper, a pair of rotatable carriers positioned in the hopper with their axes of rotation out of parallelism and alinement so as to be relatively closely spaced with respect to one another but out of contact at portions at one side of the axes of rotation and relatively widely spaced from one another at portions at the other side of the axes of rotation, radially outwardly extending hinged means peripherally carried on the carriers to pick up seeds from the hopper at the widely spaced portions, means for causing seeds to be discharged from the pick-up means at the closely spaced portions, an axially disposed drive shaft respectively carried by each carrier, and means drivingly interconnecting adjacent ends of said drive shafts to cause conjoint rotation of the carriers.

4. A planter comprising a hopper, a pair of rotatable carriers positioned in the hopper with their axes of rotation out of alinement and parallelism so as to be relatively closely spaced with respect to one another but out of contact at portions at one side of the axes of rotation and relatively widely spaced with respect to one another at the other side of the axes of rotation, a plurality of hinged radially outwardly extending seed-receiving means mounted on the periphery of the carriers so as to be generally equally spaced from one another and from the axes of rotation, means for releasing seeds from the seed-receiving means at the relatively closely spaced portions of the carriers, and means applying driving force to the carriers at their axes of rotation.

5. In a potato planter comprising a hopper, a pair of rotatable disk-like carriers positioned in the hopper with their axes of rotation intersecting at an obtuse angle to incline the carriers so as to be relatively closely spaced but out of contact at portions at one side of the axes of rotation and relatively widely spaced from one another at portions at the other side of the axes of rotation, radially outwardly extending hinged seed impaling members carried on the disk-like carriers and adapted to pick up seeds from the hopper at the widely spaced portions, means for releasing seeds from the impaling members at the closely spaced portions of the carriers, each disk-like carrier including an axial shaft to mount and drive same, and a shaft having a universal joint at each end respectively connected to the carrier shafts for conjoint drive of the shafts and carriers.

LEE H. KAUPKE.
LEWIS E. SMITH.